United States Patent
Bonfield et al.

(10) Patent No.: US 6,582,672 B1
(45) Date of Patent: Jun. 24, 2003

(54) METHOD FOR THE PREPARATION OF CARBONATED HYDROXYAPATITE COMPOSITIONS

(75) Inventors: William Bonfield, Herts (GB); Iain Ronald Gibson, Aberdeen (GB)

(73) Assignee: ApaTech Limited, London (GB)

( * ) Notice: Subject to any disclaimer, the term of this patent is extended or adjusted under 35 U.S.C. 154(b) by 0 days.

(21) Appl. No.: 09/581,203

(22) PCT Filed: Dec. 17, 1998

(86) PCT No.: PCT/GB98/03823

§ 371 (c)(1),
(2), (4) Date: Aug. 8, 2000

(87) PCT Pub. No.: WO99/32401

PCT Pub. Date: Jul. 1, 1999

(30) Foreign Application Priority Data

Dec. 22, 1997 (GB) ............................................. 9727049

(51) Int. Cl.⁷ ............................................. C01B 25/32
(52) U.S. Cl. ........................ 423/308; 423/309; 423/311
(58) Field of Search ................................ 423/308, 311, 423/309

(56) References Cited

U.S. PATENT DOCUMENTS 5,470,803 A * 11/1995 Bonfield et al. ............. 423/308
5,962,028 A * 10/1999 Constantz ................... 423/308

FOREIGN PATENT DOCUMENTS

| EP | 0 625 490 A | 11/1994 |
| EP | 0 722 772 A | 7/1996 |
| WO | WO 94 08458 A | 4/1994 |

OTHER PUBLICATIONS

Patent Abstracts of Japan, Jun. 30, 1997, & JP 09 040408 A (Taihei Kagaku Sangyo KK), Feb. 10, 1997.

* cited by examiner

*Primary Examiner*—Wayne A. Langel
(74) *Attorney, Agent, or Firm*—Bacon & Thomas, PLLC (57) ABSTRACT

A process for the preparation of a single phase carbonate-substituted hydroxyapatite composition, which process comprises the steps of (i) preparing an aqueous solution containing $Co_3^{2-}$ and $PO_4^{3-}$ ions in the substantial absence of cations other than $H^+$ ions: (ii) mixing the solution from step (i) with an aqueous solution or suspension of a calcium compound; and (iii) collecting and drying the precipitate formed in step (ii); the ratio of Ca/P in the calcium-containing solution or suspension and the phosphorus-containing solution, when mixed together, being maintained above 1.67. The product of the process is novel with a Ca/P molar ratio of greater than 1.67 and comprises up to 5% by weight of $CO_3^{2-}$ ions substituted in the B site or the B and A sites of the hydroxyapatite structure, with at least 50% of the $CO_3^{2-}$ ions being substituted on the B site. This product does not contain $Na^+$ or $NH_4^+$ ions.

19 Claims, 6 Drawing Sheets

METHOD FOR THE PREPARATION OF CARBONATED HYDROXYAPATITE COMPOSITIONS

The present invention relates to a method for forming a carbonated hydroxyapatite composition and, in particular, to a method for forming carbonated hydroxyapatite compositions which are substantially sodium-free and ammonium-free.

Synthetic hydroxyapatite $Ca_{10}(PO_4)_6(OH)_2$ has been reported as having been used as a bone replacement material in porous, granular, plasma sprayed and dense forms. Investigations have shown hydroxyapatite to be similar structurally to bone material. However hydroxyapatite is one of the range of stoichiometric calcium phosphate apatites. Human and animal bone mineral have been shown to contain significant amounts of from 3 to 7 wt% of carbonate. There is evidence that the carbonate group can substitute in two sites, the phosphate and hydroxyl sites, termed B and A respectively; bone mineral being predominantly a B type apatite. As a result of this similarity in chemical composition, it is envisaged that carbonated hydroxyapatite will have better bioactivity than unsubstituted stoichiometric hydroxyapatite which is currently used in commercial applications, such as plasma-sprayed coatings on metallic implants and porous hydroxyapatite ceramic bone substitutes. A carbonate substituted hydroxyapatite would also find application for use in chromatography and for purification, such as the removal of heavy metal ions by adsorption.

The preparation of carbonate-substituted hydroxyapatite ceramic materials must be easy and reproducible in order to achieve commercial exploitation. Additionally, the carbonate-substituted hydroxyapatite composition must be thermally stable such that it will not decompose to undesirable secondary phases (e.g. tricalcium phosphate or calcium oxide) upon calcining/sintering. Furthermore, during this heat treatment, the carbonate-substituted hydroxyapatite must not lose the carbonate ions that have been substituted into the hydroxyapatite structure.

Up to the present time, the methods which have been reported to prepare carbonate-substituted hydroxyapatite compositions have involved one of the following procedures.

The heating of a stoichiometric hydroxyapatite ceramic composition in a $CO_2$ atmosphere at approximately 900° C. for several days [R. Wallaeys, Silicon, Sulphur, Phosphates. Coll. Int. Union Pure Appl. Chem. Münster (1954) 183–190]. This process results in low levels of carbonate substitution, with poor control over the extent of carbonate substitution and the homogeneity of the substitution throughout the sample. Furthermore, the carbonate substitution is at the wrong site, i.e. the A site, to provide a material which is equivalent to bone.

A wet precipitation method using $Na_2CO_3$, $NaHCO_3$ or $(NH_4)_2CO_3$ as a source of carbonate ions results in the substitution of the additional ions, $Na^+$ or $NH_4^+$, into the hydroxyapatite structure, poor thermal stability of the product upon calcining/sintering, the loss of large quantities of the carbonate ions upon heating, and poor control of the levels of the carbonate substitution. See, for example: Y. Doi, Y. Moriwaki, T. Aoba, M. Okazati, J. Takahashi and K. Joshin, "Carbonate apatites from aqueous and non-aqueous media studied by esr, IR and X-Ray Diffraction: Effect of $NH_4^+$ ions on crystallographic parameters", J. Deut. Res. 61(1982) 429–434. D. G. A. Nelson and J. D. B. Featherstone, "Preparation analysis and characterization of Carbonated apatites", Calcif. Tiss. Int. 34(1082) 569–581.

EP-A-0722773 and JP-A-8225312 disclose the preparation of an A-type substituted hydroxyapatite in which the carbonate ions substitute for $OH^-$ ions in the structure.

EP-A-0626590 discloses the preparation of a carbonate substituted apatite in which the Ca/P ratio is maintained at approximately 1.66 and sodium and carbonate ions are co-substituted into the lattice with the amount of carbonate that is substituted being controlled by the amount of sodium bicarbonate used in the reaction.

WO-A-94/08458 discloses a process for the preparation of carbonated hydroxyapatite in which the starting materials are mixed at room temperature and the material sets to form a cement at room or physiological temperature. The source of carbonate ions is solid calcium carbonate. The material produced is poorly-crystalline or amorphous apatite which contains sodium ions.

JP-A-61151011 discloses adding $Ca(OH)_2$ and $CaCO_3$ to a slurry of $CaHPO_4$. The $CO_3$ ions are introduced into the reaction mixture as insoluble $CaCO_3$ and not via solution. The ratios of Ca/P used are always less than 1.67. After sintering at 1000° to 1100° C. the carbonate content of the resulting material is less than 0.1%.

It is mainly due to the problems encountered with the preparation routes discussed above that these routes have not been developed to prepare carbonate-substituted hydroxyapatite ceramic materials commercially.

We have now developed a novel process for the preparation of a single phase carbonate-substituted hydroxyapatite composition which overcomes the problems of the prior art methods and does not contain sodium or ammonium ions.

Accordingly, the present invention provides a process for the preparation of a carbonate-substituted hydroxyapatite, which process comprises the steps of (i) preparing an aqueous solution containing $CO_3^{2-}$ and $PO_4^{3-}$ ions in the substantial absence of cations other than $H^+$ ions:

(ii) mixing the solution from step (i) with an aqueous solution or suspension of a calcium compound; and (iii) collecting and drying the precipitate formed in step (ii);

the ratio of Ca/P in the calcium-containing solution or suspension and the phosphorus-containing solution, when mixed together, being maintained above 1.67.

The single-phase carbonate-substituted hydroxyapatite compositions prepared in accordance with the present invention are believed to be novel and, accordingly, in another aspect the present invention provides a single phase carbonate-substituted hydroxyapatite composition, with a Ca/P ratio of greater than 1.67, which comprises up to 5% by weight of $CO_3^{2-}$ ions substituted in the B ($PO_4$) site or the B and A sites of the hydroxyapatite structure, with at least 50% of the $CO_3^{2-}$ ions substituted on the B site, and which does not contain $Na^+$ or $NH_4^+$ ions.

In carrying out the process of the present invention the aqueous solution of step (i) may be prepared by bubbling carbon dioxide through water to form carbonic acid, and then adding phosphoric acid, $H_3PO_4$, thereto, or by adding carbon dioxide gas to water under high pressure and then adding phosphoric acid thereto. The amount of carbon dioxide absorbed by the solution can be calculated from the pH of the solution prior to the addition of $H_3PO_4$. At a pH of about 4.0 the solution will be fully saturated with carbon dioxide. Generally $H_3PO_4$ will be added to the solution of carbonic acid in order to provide the $PO_4^{3-}$ ions for reaction.

Alternatively, the aqueous solution of step (i) may be prepared by bubbling carbon dioxide through a solution of $H_3PO_4$ or adding carbon dioxide under pressure to the solution, in order to form $CO_3^{2-}$ ions in situ. Furthermore, $CO_2$ may be introduced as a solid which carbonates the solution as it vaporises.

The solution from step (i) of the process is mixed in step (ii) with an aqueous solution or suspension of a calcium compound. For example, a solution of calcium nitrate, $Ca(NO_3)_2$, or a suspension of calcium hydroxide, $Ca(OH)_2$, may be used. Preferably the mixing will be carried out by dropwise addition of the solution from step (i) to the calcium-containing solution or suspension. However, bulk mixing of the solution and the suspension may be undertaken provided that the combined mixture is vigorously stirred in order to provide the precipitation reaction.

During the mixing in step (ii) of the process carbon dioxide may be bubbled through the mixture.

The ratio of Ca to P in the calcium-containing solution or suspension and the phosphorus-containing solution, when mixed together, is maintained at above 1.67 in order to promote substitution in both the A and B sites to give an AB-substituted hydroxyapatite if having the formula:

$$Ca_{10}(PO_4)_{6-x}(CO_3)_x(OH)_{2-y}(CO_3)_y$$

Preferably the Ca/P ratio is maintained in the range from above 1.67 to 1.84, more preferably from above 1.67 to 1.76.

After the addition of the reactants is complete the pH of the mixture may be adjusted, if desired, to pH 10 to 11 by the addition of ammonia. If ammonia is added in this manner then appropriate steps are taken to remove the ammonia from the final product.

The dried precipitate from step (iii) of the process may be calcined/sintered in a wet carbon dioxide atmosphere according to the teaching of EP-0625490B. In particular, the dried precipitate may be calcined in carbon dioxide containing from 0.001 to 0.10 of grams of water per liter of gas at a temperature in the range of from 700° to 1200° C., preferably from 900° to 1200° C. Preferably the carbon dioxide used as the sintering atmosphere will contain from 0.01 to 0.02 grams of water per liter of gas. The sintering time will generally be up to 24 hours, preferably 10 minutes to 4 hours.

The sintering will generally be carried out at atmospheric pressure, i.e. no imposed pressure, although pressures slightly higher than atmospheric may be produced by the particular configuration of the furnace used.

The carbonated hydroxyapatite compositions produced according to the process of the present invention will generally comprise up to 5% by weight of $CO_3^{2-}$ ions, preferably from 3 to 5% by weight. Furthermore, the carbonated hydroxyapatite composition will generally have from 50 to 85% of the $CO_3^{2-}$ ions substituted on the B site.

The carbonated hydroxyapatite compositions produced according to the process of the present invention are prepared in the substantial absence of cations other than $H^+$ and $Ca^{2+}$. Accordingly, the compositions do not contain other cations, such as $Na^+$ or $NH_4^+$, substituted in their structures, and thus are biocompatible. The carbonated hydroxyapatite compositions prepared in accordance with the present invention may be used in any of the applications for which hydroxyapatite is used, for example the formation of plasma-sprayed coatings on metallic implants, the formation of porous ceramic bone substitutes, the preparation of composites with polymeric materials such as high density polyethylene, as granules or beads for packing or filling bone defects, as materials for use in chromatography or as materials for use in purification methods such as the removal of heavy metals by adsorption.

The present invention is further described hereinbelow with reference to the accompanying drawings, in which.

The present invention will be further described with reference to the following Examples.

EXAMPLES 1 to 5

A suspension of calcium hydroxide was prepared by dispersing 38.25 g of $Ca(OH)_2$(AnalaR, BDH), in 1 liter of deionised water. This suspension was stirred for 15 minutes prior to further reaction to form solution A.

Carbon dioxide ($CO_2$) gas was bubbled into 0.75 liters of deionised water over a period of 30 minutes during which time the pH of the solution decreased from approximately 7 to approximately 4. Phosphoric acid, $H_3PO_4$, (BDH GPR 85% assay) 0.3 moles (34.588 g) was added to the 0.75 liters of $CO_2$-treated water and this solution was then made up to a total of 1 liter with deionised water to form solution B.

Solution B was added dropwise to solution A, which was stirred constantly; the addition of solution B took approximately 3 hours and was performed at room temperature. After the addition of solution B the pH of the.resulting mixture was adjusted to 10.5–11 with the addition of approximately 10 ml of ammonia (BDH AnalaR). The mixture was stirred for 2 hours and then aged overnight without stirring. The aged mixture was filtered, the filtercake was washed with two 100 ml portions of deionised water to remove any residual ammonia and the resulting filtercake was dried at 80° C. overnight. The dried filtercake was crushed and ground to a fine powder having an average particle size of below 100 $\mu$m.

The procedure detailed above was repeated four times using different quantities of $Ca(OH)_2$ to prepare the carbonate-substituted hydroxyapatite, whilst using the-same amount (0.3 moles) of $H_3PO_4$.

Further details are given in Table 1 below:

TABLE 1

| Example No | Ca(moles) | $Ca(OH)_2$(g) | Ca/P ratios |
|---|---|---|---|
| 1 | 0.516 | 38.250 | 1.72 |
| 2 | 0.540 | 40.013 | 1.80 |
| 3 | 0.528 | 39.124 | 1.76 |
| 4 | 0.522 | 38.679 | 1.74 |
| 5 | 0.534 | 39.568 | 1.78 |

The carbonate-substituted hydroxyapatites prepared as described above were thermally stable to 900° to 1200° C. in a $CO_2/H_2O$ atmosphere. Above these temperatures, partial decomposition to hydroxyapatite and calcium oxide/calcium carbonate was observed.

Figure 1:
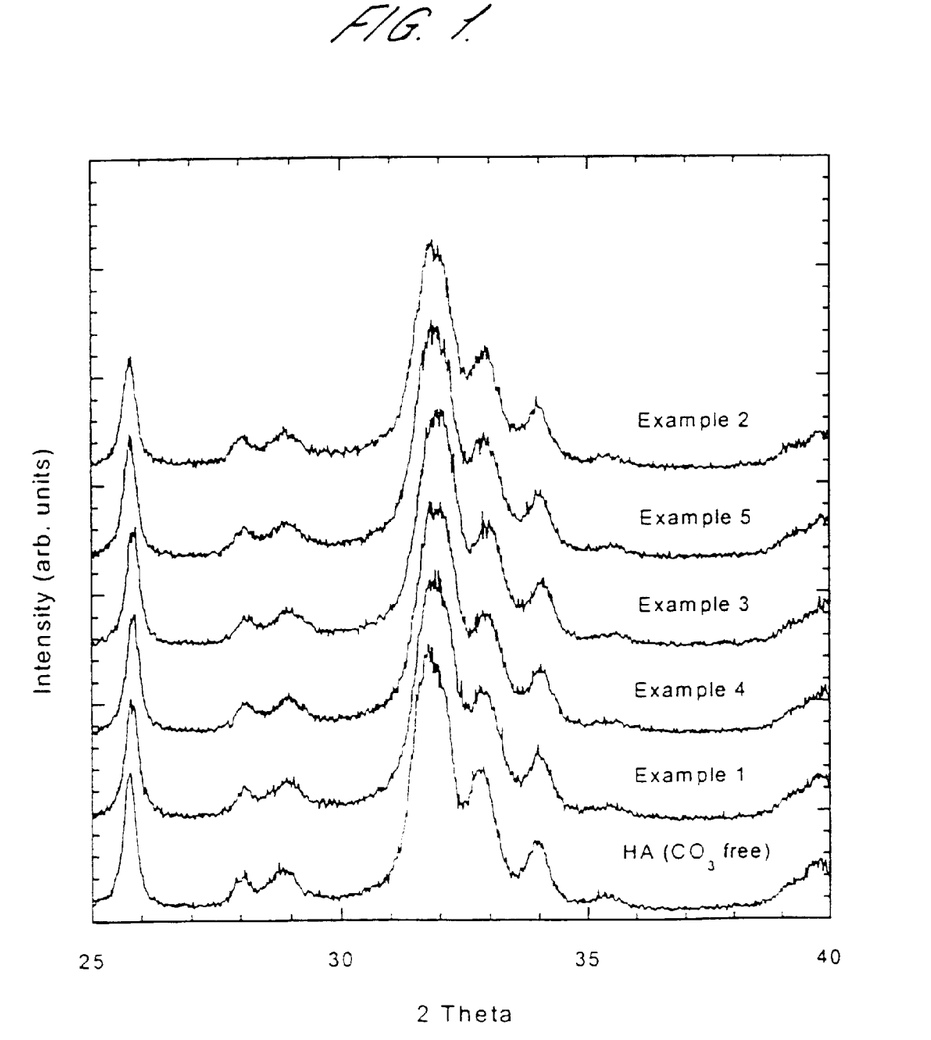
FIGS. 1 and 2 show X-ray diffraction data for the compositions of Examples 1 to 5, and for unsubstituted hydroxyapatite having a Ca/P ratio of 1.67.
Figure 2:
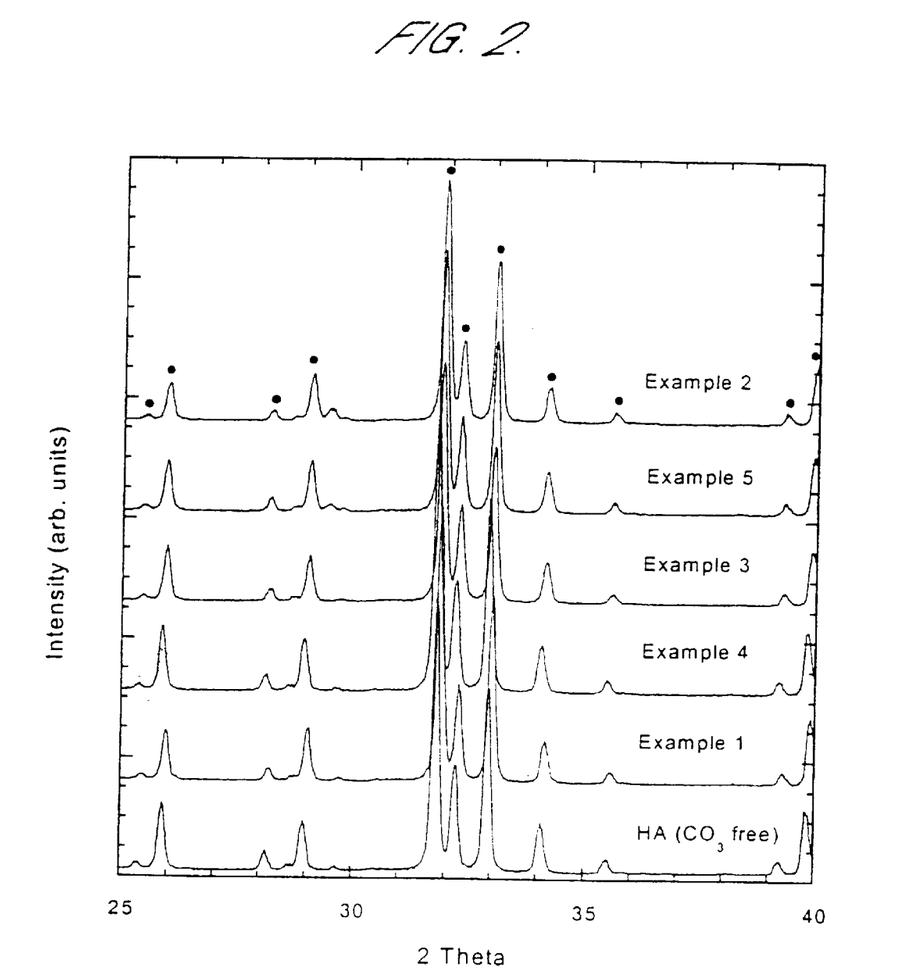

The precipitated and calcined/sintered powders (900° C. $CO_2/H_2O$ were characterized by CHN analysis, XRF, XRD and FTIR analysis. FIGS. 1 and 2 show X-ray diffraction data for the prepared and calcined/ sintered carbonate-substituted hydroxyapatite samples of Examples 1 to 5, and for unsubstituted hydroxyapatite having a Ca/P ratio of 1.67. The X-ray diffraction data does not show any peaks attributable to calcium oxide or tricalcium phosphate which would be obtained as decomposition products if the carbonate-substituted hydroxyapatite resulted from the A-type substitution (calcium-rich) or B-type substitution (calcium-deficient) mechanisms. This confirms that the carbonate-substituted hydroxyapatite is of the AB-type.

The X-ray diffraction patterns of calcined/sintered samples (FIG. 2) with Ca/P ratios of 1.67 to 1.76 show only peaks corresponding to HA. Samples prepared with Ca/P ratios above 1.76 show small levels of $CaCO_3$ with HA as the main phase (>95%). However, lower calcination temperatures (i.e. less than 900° C.) will result in no decomposition to $CaCO_3$.

Fourier Transform Infra-red Spectroscopy (FTIR) analysis allows the identification of different functional groups, such as OH, $PO_4$ and $CO_3$, by their characteristic vibration frequencies; the energy of most molecular vibrations correspond to the infrared region of the electromagnetic spectrum. FTIR spectroscopy is an ideal method for determining the presence or absence of different functional groups in hydroxyapatite. Stoichiometric, unsubstituted hydroxyapatite should produce only vibrational bands corresponding to OH and $PO_4$ groups in the FTIR spectrum. In addition to detecting the $CO_3$ groups in a carbonate-substituted hydroxyapatite, FTIR spectroscopy should indicate the effect of the substituted $CO_3$ groups on the sites that it will be occupying in the HA lattice i.e. the $PO_4$ and/or the OH groups.

Figure 5:
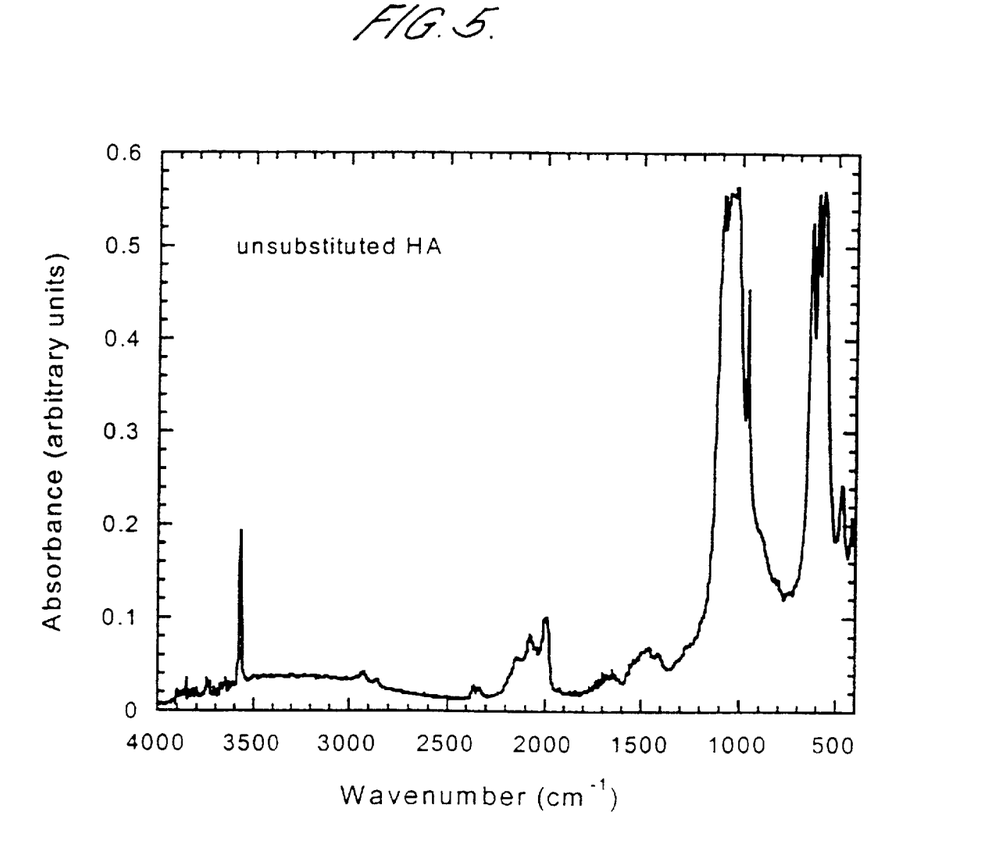
FIG. 5 is the FTIR spectrum of unsubstituted hydroxyapatite sintered at 900° C. in air.
Figure 6:
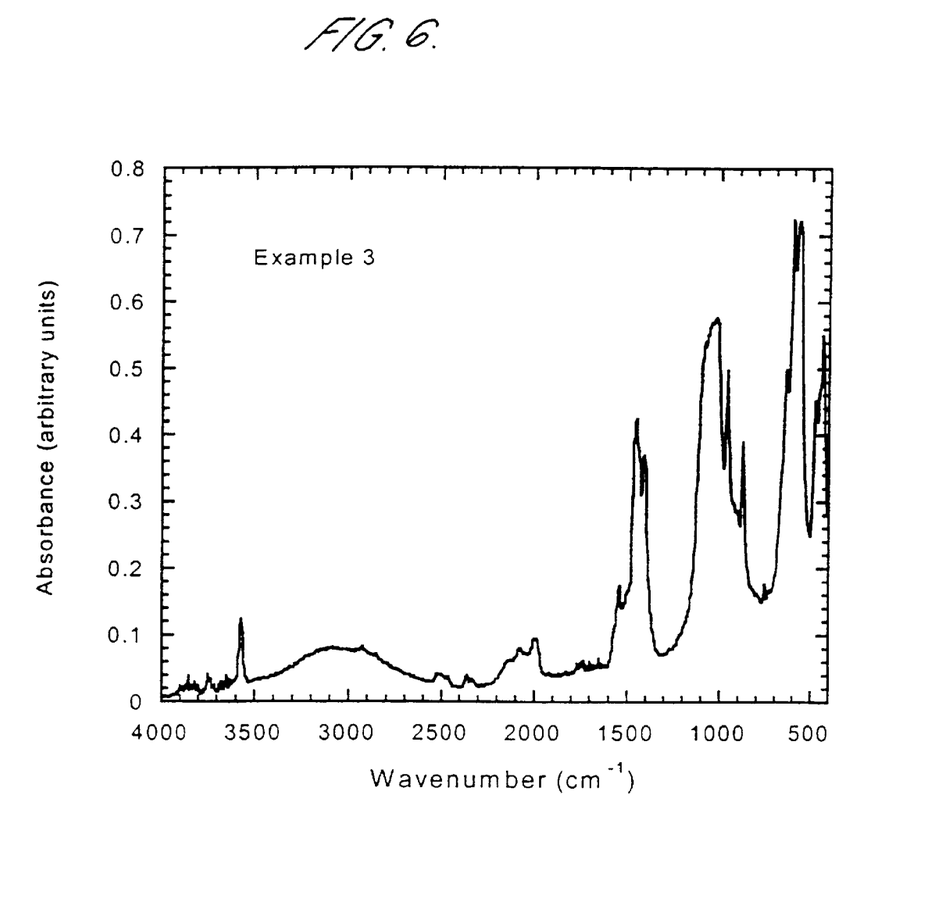
FIG. 6 is the FTIR spectrum of the carbonate-substituted hydroxyapatite of Example 3 sintered at 900° C. in $CO_2/H_2O$.

FTIR spectra for an unsubstituted hydroxyapatite and carbonate-substituted hydroxyapatite produced in the present invention (Example 3) are shown in FIGS. 5 and 6, respectively. The unsubstituted hydroxyapatite has a sharp peak at approx. 3571 $cm^{-1}$ that corresponds to OH groups and the peaks at 1065, 1042, 1023, 961 and 629, 599 and 570 $cm^{-1}$ correspond to $PO_4$ groups. For the carbonate-substituted hydroxyapatite, the peaks corresponding to $PO_4$ bands, at 1083, 1045, 1021, 961 and 636, 602, and 584 $cm^{-1}$, are slightly displaced from the values observed for unsubstituted hydroxyapatite. The significant changes observed in the spectrum for the carbonate-substituted hydroxyapatite are that the OH peak appears to be of a lower intensity compared to the other peaks, suggesting less OH groups in the carbonate-substituted hydroxyapatite. Also, carbonate, $CO_3$, groups are identified by peaks at 1542, 1454, 1410 and at 877 $cm^{-1}$. In addition, small shoulders were observed on both sides of the peak at 1454 $cm^{-1}$; these peaks were at approximately 1420 and 1480 $cm^{-1}$. Results of FTIR analysis of A and B-type carbonate substituted hydroxyapatites reported in studies by Le Geros et al (*Specialia Experimentia* 25, 5–7, 1969), Nelson et al (*Calcif. Tiss. Int.* 34, 569–581,1982) and Doi et al (*J. Dent. Res.* 61, 429–434, 1982) indicate that the peaks observed for the carbonate-substituted hydroxyapatite produced in the present invention (Example 3) correspond to an AB-mixed substitution of $CO_3$ in the hydroxyapatite lattice.

CHN analysis, of the as-prepared carbonate-substituted hydroxyapatite powders and the resulting heated/sintered material showed that no nitrogen (and therefore, ammonia, $NH_3$) was present. The amount of carbonate in the carbonate-substituted hydroxyapatite powders and the resulting heated/sintered material varied from 0 to approximately 5 wt %, depending upon the Ca/P ratio of the material; higher Ca/P ratios resulted in more carbonate substitution.

Sintering Data

Figure 3:
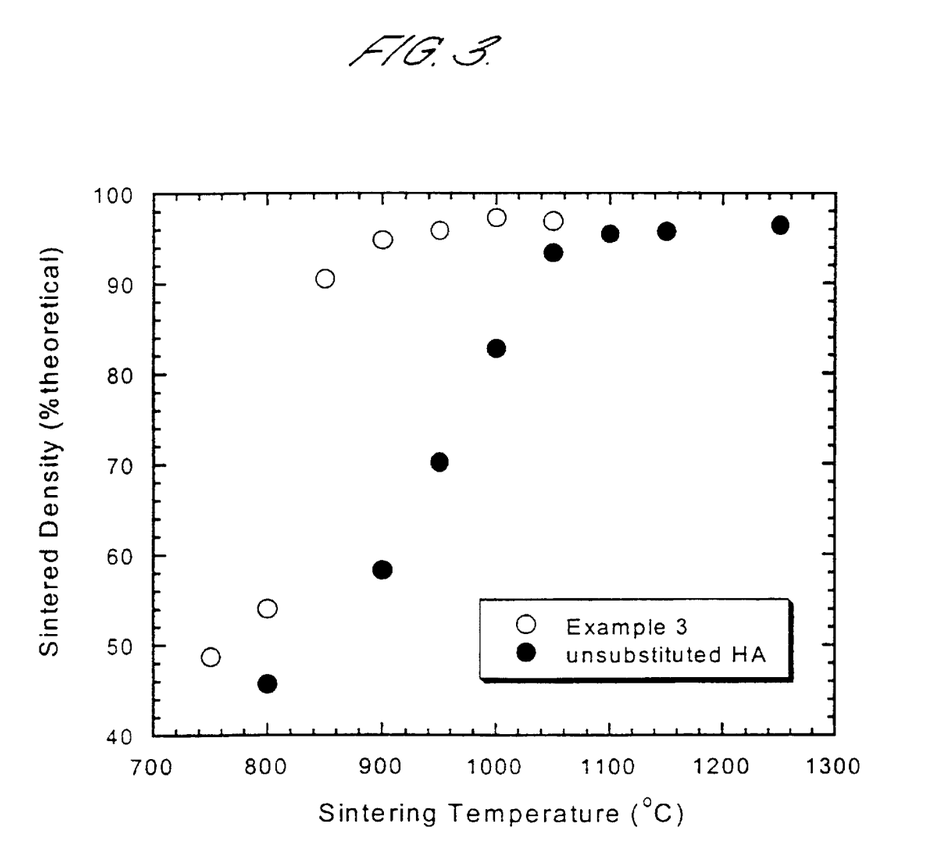
FIG. 3 shows the effect of sintering temperature on the sintered density of unsubstituted hydroxyapatite and the carbonate-substituted hydroxyapatite of Example 3.

The carbonate-substituted hydroxyapatites produced in the present invention sinter to higher densities for a specific temperature between 750 and 1050° C. than unsubstituted hydroxyapatite. FIG. 3 shows the effect of sintering temperature on the sintered density of unsubstituted hydroxyapatite and the carbonate-substituted hydroxyapatite produced in Example 3 (sintering conditions as follows: for carbonate-substituted hydroxyapatite, atmosphere of $CO_2$/$H_2O$ as described in method, and for unsubstituted hydroxyapatite, atmosphere of air. For both materials, a heating rate of 2.5° C./min to temperature, dwell time of 2 hours, and cooling-rate of 10° C./min to room temperature). The substitution of carbonate ions in to the hydroxyapatite lattice results in a powder that sinters to form a ceramic with a high density at temperatures that are regarded as low for ceramics in general.

Figure 4:
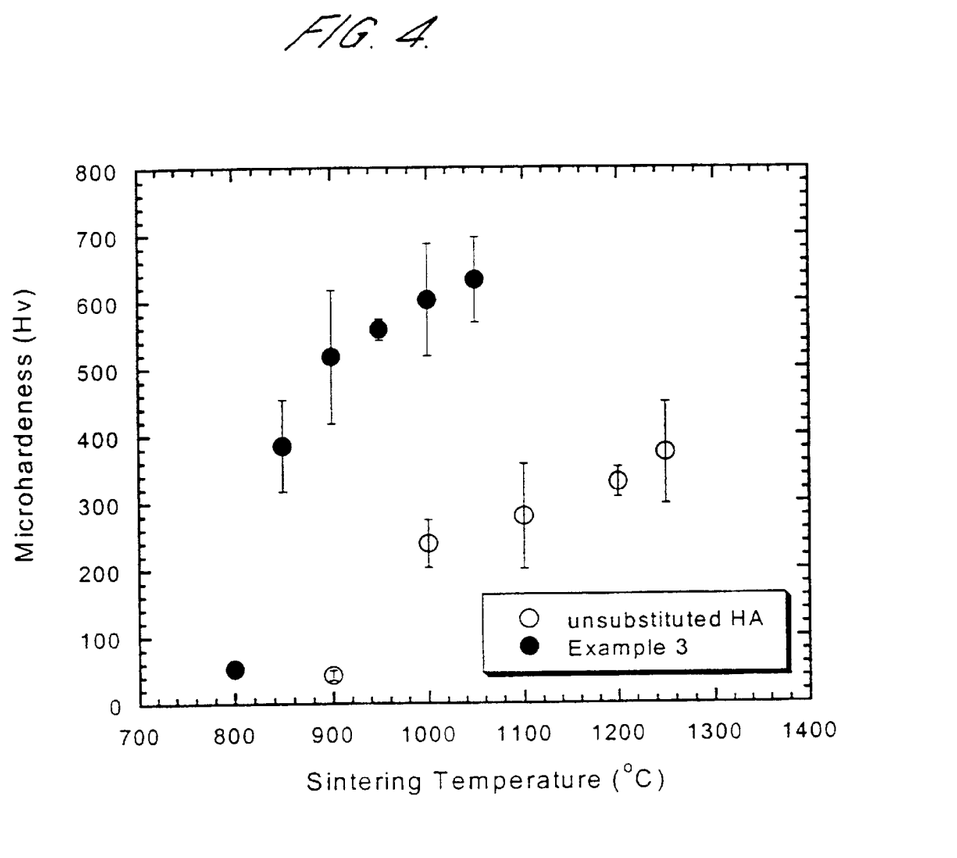
FIG. 4 shows the microhardness of unsubstituted hydroxyapatite as compared to the carbonate-substituted hydroxyapatite of Example 3 at different temperatures.

The high densities achieved with the carbonate-substituted hydroxyapatite produced in the present invention result in superior mechanical properties compared to unsubstituted hydroxyapatite, as reflected by microhardness determination, FIG. 4. To determine the microhardness, an applied load of 0.5 kg was applied to the polished surface of a ceramic sample for 10 seconds. The average diagonal length of the indent was measured and the microhardness, Hv, was calculated from the method described in ASTM E384. For a given sintering temperature, the microhardness of the carbonate-substituted hydroxyapatite produced in the present invention was significantly greater than the value for unsubstituted hydroxyapatite Additionally, the reproducibility of the method described in the present invention has been tested. Three repeat batches (50 g) were made with the same starting Ca/P ratio (1.76). A large-scale batch (150 g) was also made. The results of CHN (wt % carbonate determination) analysis of these four powders are listed in Table 2; samples were measured as-prepared (processed powders prior to heat-treatment) and after sintering at 900° C. in a $CO_2$/$H_2O$ atmosphere.

| Sample ID | Method | Heat Treatment | wt % $CO_3$ |
|---|---|---|---|
| Unsubstituted HA Ca/P = 1.67 | Normal pptn | as-ppd | 1.7 |
| | | 900° C. air | — |
| Example 3 (i) | Present invention | as-ppd | 3.7 |
| | | 900° C. $CO_2$ | 3.2 |
| Example 3 (ii) | Present invention | as-ppd | 4.1 |
| | | 900° C. $CO_2$ | 3.3 |
| Example 3 (iii) | Present invention | as-ppd | 4.0 |
| | | 900° C. $CO_2$ | 3.2 |
| Example 3 (iv) | Present invention (large-scale) | as-ppd | 3.6 |
| | | 900° C. $CO_2$ | 3.1 |

Preliminary Investigation of the Bioactivity of Carbonate-substituted Hydroxyapatite The bioactivity of the carbonate-substituted hydroxyapatite produced in the present invention compared to unsubstituted hydroxyapatite has been assessed by testing the ceramic specimens in Simulated Body Fluid (SBF), which contains the type and concentration of the ions that are present in human plasma. This test demonstrates the time required for a new bone-like apatite layer to precipitate on the surface of the test ceramic specimen, the shorter the time, the more bioactive the material. The carbonate-substituted hydroxyapatite (Example 3) produced in the present invention resulted in the formation of a new bone-like apatite layer in less than 7 days, whereas the unsubstituted hydroxyapatite required 24–28 days. This test provides an early indication of the improved biological properties that the carbonate-substituted hydroxyapatite produced in the present invention may offer compared to unsubstituted hydroxyapatite.

The results from these analyses indicate that the carbonate-substitution is a combined AB-type substitution, described by the equation:

$$Ca_{10}(PO_4)_{6+x}(CO_3)_x(OH)_{2+y}(CO_3)_y$$

with at least 50% of the $CO_3^{2+}$ being substituted on the B site of the hydroxyapatite structure.

What is claimed:

1. A process for the preparation of a calcined single phase carbonate-substituted hydroxyapatite composition, which process comprises the steps of
   (i) preparing an aqueous solution containing $CO_3^{2-}$ and $PO_4^{3-}$ ions in the substantial absence of cations other than $H^+$ ions:
   (ii) mixing the solution from step (i) with an aqueous solution or suspension of a calcium compound;
   (iii) collecting and drying the precipitate formed in step (ii); and
   (iv) calcining the dried precipitate from step (iii) in carbon dioxide containing from 0.001 to 0.10 grams of water per liter of gas at a temperature of from 700° to 1200° C.
the ratio of Ca/P in the calcium-containing solution or suspension and the phosphorus-containing solution, when mixed together, being maintained above 1.67.

2. A process as claimed in claim 1 wherein the aqueous solution of step (i) is prepared by bubbling $CO_2$ through water to obtain a solution of carbonic acid-and then adding $H_3PO_4$ thereto.

3. A process as claimed in claim 2 wherein the carbonic acid solution has a pH of about 4 before and addition of $H_3PO_4$.

4. A process as claimed in claim 1 wherein the solution from step (i) is added dropwise with stirring to the aqueous solution or suspension of the calcium compound.

5. A process as claimed in claim 1 wherein a calcium nitrate solution or a calcium hydroxide suspension is used in step (ii).

6. A process as claimed in claim 1 wherein $CO_2$ is passed through the solution from step (i) during mixing step (ii).

7. A process as claimed in claim 1 wherein the ratio of Ca/P in the calcium-containing solution or suspension and the phosphorus-containing solution, when mixed together, is in the range of from above 1.67 to 1.76.

8. A process as claimed in claim 1 wherein the carbonated hydroxyapatite composition comprises up to 5% by weight of $CO_3^{2-}$ ions.

9. A process as claimed in claim 2 wherein the solution from step (i) is added dropwise with stirring to the aqueous solution or suspension of the calcium compound.

10. A process as claimed in claim 3 wherein the solution from step (i) is added dropwise with stirring to the aqueous solution or suspension of the calcium compound.

11. A process as claimed in claim 2 wherein a calcium nitrate solution or a calcium hydroxide suspension is used in step (ii).

12. A process as claimed in claim 3 wherein a calcium nitrate solution or a calcium hydroxide suspension is used in step (ii).

13. A process as claimed in claim 4 wherein a calcium nitrate solution or a calcium hydroxide suspension is used in step (ii).

14. A process as claimed in claim 2 wherein $CO_2$ is passed through the solution from step (i) during mixing step (ii).

15. A process as claimed in claim 3 wherein $CO_2$ is passed through the solution from step (i) during mixing step (ii).

16. A calcined carbonate-substituted hydroxyapatite whenever prepared by a process which comprises the steps of
   (i) preparing an aqueous solution containing $CO_3^{2-}$ and $PO_4^{3-}$ ions in the substantial absence of cations other than $H^+$ ions:
   (ii) mixing the solution from step (i) with an aqueous solution or suspension of a calcium compound;
   (iii) collecting and drying the precipitate formed in step (ii); and
   (iv) calcining the dried precipitate from step (iii) in carbon dioxide containing from 0.001 to 0.10 grams of water per liter of gas at a temperature of from 700° to 1200° C.
the ratio of Ca/P in the calcium-containing solution or suspension and the phosphorus-containing solution, when mixed together, being maintained above 1.67.

17. A calcined single phase carbonate-substituted hydroxyapatite composition, with a Ca/P molar ratio of greater than 1.67, which comprises up to 5% by weight of $CO_3^{2-}$ ions substituted in the B ($PO_4$) site or the B and A sites of the hydroxyapatite structure, with at least 50% of the $CO_3^{2-}$ ions substituted on the B site, and which does not contain $Na^+$ or $NH_4^+$ ions.

18. A calcined single phase carbonate-substituted hydroxyapatite as claimed in claim 17 wherein from 50 to 85% of the $CO_3^{2-}$ ions are substituted on the B site.

19. A calcined single phase carbonate-substituted hydroxyapatite which comprises from 3 to 5% by weight of $CO_3^{2-}$ ions substituted in the B ($PO_4$) hydroxyapatite structure.

* * * * *